(12) United States Patent
Krogen

(10) Patent No.: US 9,214,844 B2
(45) Date of Patent: Dec. 15, 2015

(54) METHOD FOR SECURING A MOTOR HOUSING TO A MOTOR ASSEMBLY

(75) Inventor: Oystein Krogen, Strangnas (SE)

(73) Assignee: KOLLMORGEN CORPORATION, Simsbury, CT (US)

( * ) Notice: Subject to any disclaimer, the term of this patent is extended or adjusted under 35 U.S.C. 154(b) by 1490 days.

(21) Appl. No.: 10/987,835

(22) Filed: Nov. 12, 2004

(65) Prior Publication Data

US 2005/0223540 A1    Oct. 13, 2005

Related U.S. Application Data

(60) Provisional application No. 60/519,969, filed on Nov. 13, 2003.

(51) Int. Cl.
*H02K 15/14* (2006.01)
*H02K 15/02* (2006.01)

(52) U.S. Cl.
CPC ........... *H02K 15/02* (2013.01); *Y10T 29/49009* (2015.01)

(58) Field of Classification Search
CPC ............................. H02K 1/17; Y10T 29/49009
USPC ............... 310/42–43, 89, 90, 154.11, 40 MN, 310/154.03, 156.25; 29/596–598, 732, 463; 417/423.14, 423.7
See application file for complete search history.

(56) References Cited

U.S. PATENT DOCUMENTS

| | | | | |
|---|---|---|---|---|
| 3,422,295 A * | 1/1969 | Parker | ............................. | 310/42 |
| 4,505,031 A * | 3/1985 | Colwell et al. | .................. | 29/596 |
| 4,784,312 A * | 11/1988 | Gotoh | ........................... | 228/157 |
| 4,793,054 A * | 12/1988 | Abbratozzato et al. | ......... | 29/596 |
| 4,795,932 A * | 1/1989 | Long | ......................... | 310/154.14 |
| 4,837,468 A * | 6/1989 | Froment | ........................ | 310/42 |
| 4,918,802 A * | 4/1990 | Schaefer | ......................... | 29/598 |
| 5,216,306 A * | 6/1993 | Nakazawa et al. | .............. | 310/89 |
| 5,942,827 A * | 8/1999 | Neumann et al. | ......... | 310/154.04 |
| 6,058,594 A * | 5/2000 | Neumann et al. | ............... | 29/596 |
| 6,522,042 B1 * | 2/2003 | Du et al. | .................. | 310/154.03 |
| 6,598,294 B2 * | 7/2003 | Yamaguchi et al. | ............ | 29/890 |
| 7,119,469 B2 * | 10/2006 | Ortt et al. | ................. | 310/154.08 |

* cited by examiner

*Primary Examiner* — Minh Trinh
(74) *Attorney, Agent, or Firm* — Day Pitney LLP

(57) ABSTRACT

A method for securing a motor housing to a motor assembly is provided. One application of the method creates a motor housing to secure and protect a motor assembly. A flat metal sheet is shaped, so that deformable ends of the sheet are incrementally rolled to form a split annulus approximating the outer circumference of a motor assembly. Once the split annulus is formed, the ends are elastically deformed to facilitate inserting the motor into a hollow portion of the split annulus. After the motor is inserted, the ends may be joined by welding one to the other. This type of housing secures the motor assembly through a crimping force applied by the housing. Alternately, the ends may be welded together and to the motor assembly itself, thereby forming a strong support structure between the housing and the motor assembly.

5 Claims, 6 Drawing Sheets

METHOD FOR SECURING A MOTOR HOUSING TO A MOTOR ASSEMBLY

RELATED APPLICATION

The instant application hereby claims priority to the U.S. provisional patent application Ser. No. 60/519,969 for a "Wrap Motor Housing" filed on Nov. 13, 2003, which is also incorporated by reference herein.

FIELD OF THE INVENTION

This invention relates generally to motor housings, more particularly, to an apparatus and a method of creating the apparatus for housing a motor.

BACKGROUND OF THE INVENTION

Electric motors are manufactured in a variety of types and configurations. Typically, a motor includes a stator, a rotor, a shaft, and bearings. These assembled parts create a motor assembly around which a motor housing is used to provide structure and support. Motor housings often require a high level of precision to tightly fit and contain the enclosed motor assembly. Current methods for creating motor housings are expensive. For example, the housing could be machined to the exact specifications of the motor housing. This method, however, requires high precision machining capabilities and involves an extremely low tolerance for error in the manufacturing process.

Alternately, motor housings are often created through a two step process. The first step involves creating a cylinder slightly smaller than the motor assembly's final diameter. The second step involves, a process of fine-sizing the motor housing. Several methods of fine-sizing are known in the art. The motor assembly is then inserted into the motor housing, after the housing has been fine-sized.

FIGS. 1A-1D show one method of fine-sizing a motor assembly. It involves drawing a solid metal block through a pre-sized cylindrical tube. In FIG. 1A, a motor housing 100 is shown as a cylindrical tube having a hollow interior. The hollow interior 105 in FIG. 1A, acts to enclose and protect a motor assembly (not shown).

First, a coarse-form cylindrical metal tube is created. Next, a secondary fine-sizing operation is performed. For example, either a cylindrical or spherical metal block 110 is drawn through the motor housing 100, to expand the housing 100 to the specified tolerances and thereby accommodate the motor assembly. FIG. 1A illustrates a cylindrical metal block 110 that is chosen with a circumference equal to or slightly greater than that of the motor assembly. Once the corresponding metal block 110 is chosen, it is drawn through the motor housing 100 along a co-axial line A-A in steps as shown in FIGS. 1A-1D. This same expansion process can be completed with a spherical metal form drawn through the motor housing.

FIG. 1B illustrates the first step in the fine-sizing process, wherein the leading edge 115 of the metal block 110, deforms the proximal end 120 of the motor housing 100. In some embodiments the metal block's leading edge 115 is beveled to ease the drawing process. FIG. 1C illustrates an intermediate stage of the drawing process. FIG. 1D illustrates the step wherein the metal block 110 has been completely drawn through the motor assembly 100. At this point, the size of the motor housing 100 corresponds to the diameter of the motor assembly.

This type of fine-sizing involves additional manufacturing machinery that leads to higher production costs and increased complexity associated with the housing manufacturing process. Fine-sizing also requires extremely accurate tolerances associated with matching the stator's outer diameter to the fine-sized tube's inner circumference. Furthermore, these expansion based fine-sizing methods make it impossible to easily correct an oversize error. Once the block is drawn through the pre-sized tube or the expansion device deforms the inner circumference of the tube, the pre-sized tube's circumference can only be further expanded. Accordingly, it is difficult to correct an accidental or erroneous over-expansion.

SUMMARY OF THE INVENTION

The present invention provides an efficient alternative to the drawn metal fine-sizing process described with regard to FIGS. 1A-1D. The elements of the invention described herein provide a more efficient, less costly method of producing a motor housing.

An object of the invention relates to an efficient method of producing a motor housing by stamping or cutting a flat sheet or strip of metal. The sheet is then rolled into a semi-cylindrical hollow tube wherein the ends are almost touching. A motor assembly is inserted into the housing. Advantageously, because the housing is not a continuous cylindrical tube at this point in the process, the housing may be easily shaped to accommodate any necessary fine-sizing adjustments. This allows for a greater acceptable margin of error for the initial manufacturing process and consequently, reduces the complexity and the cost associated with manufacturing both the housing, as well as the stator core.

After any such fine-sizing adjustments are made, the housing is then joined with the motor assembly. Depending on the actual implementation, the lateral ends of the housing are fused together, and thereby act to crimp the motor assembly in place. In an alternate embodiment the lateral ends are welded to each other and the motor assembly. In another embodiment, the housing is formed from stacks of lamination which are secured in place by a slot liner and/or a motor winding. In the embodiments the motor assembly is secured in place. Furthermore, the process creates a very strong bond between the elements providing a great deal of structural support to the motor assembly. Moreover, welding the lateral ends of the housing accomplishes the fine-sizing process, to accurately fit the motor assembly and the housing.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1A:
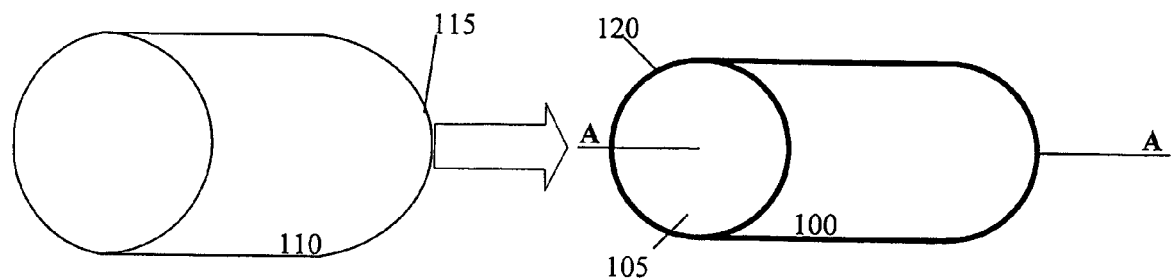
FIGS. 1A-1D illustrate a conventional process of drawn metal expansion of a motor housing.
Figure 1B:
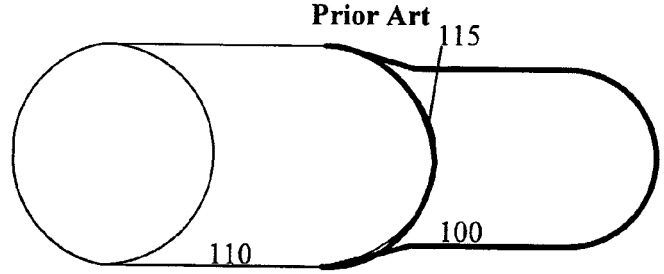
Figure 1C:
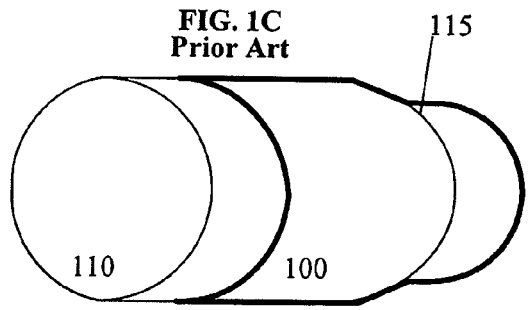
Figure 1D:
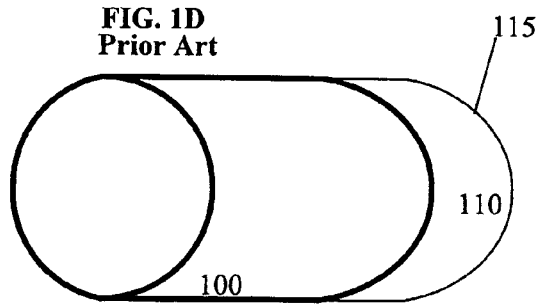
Figure 2:
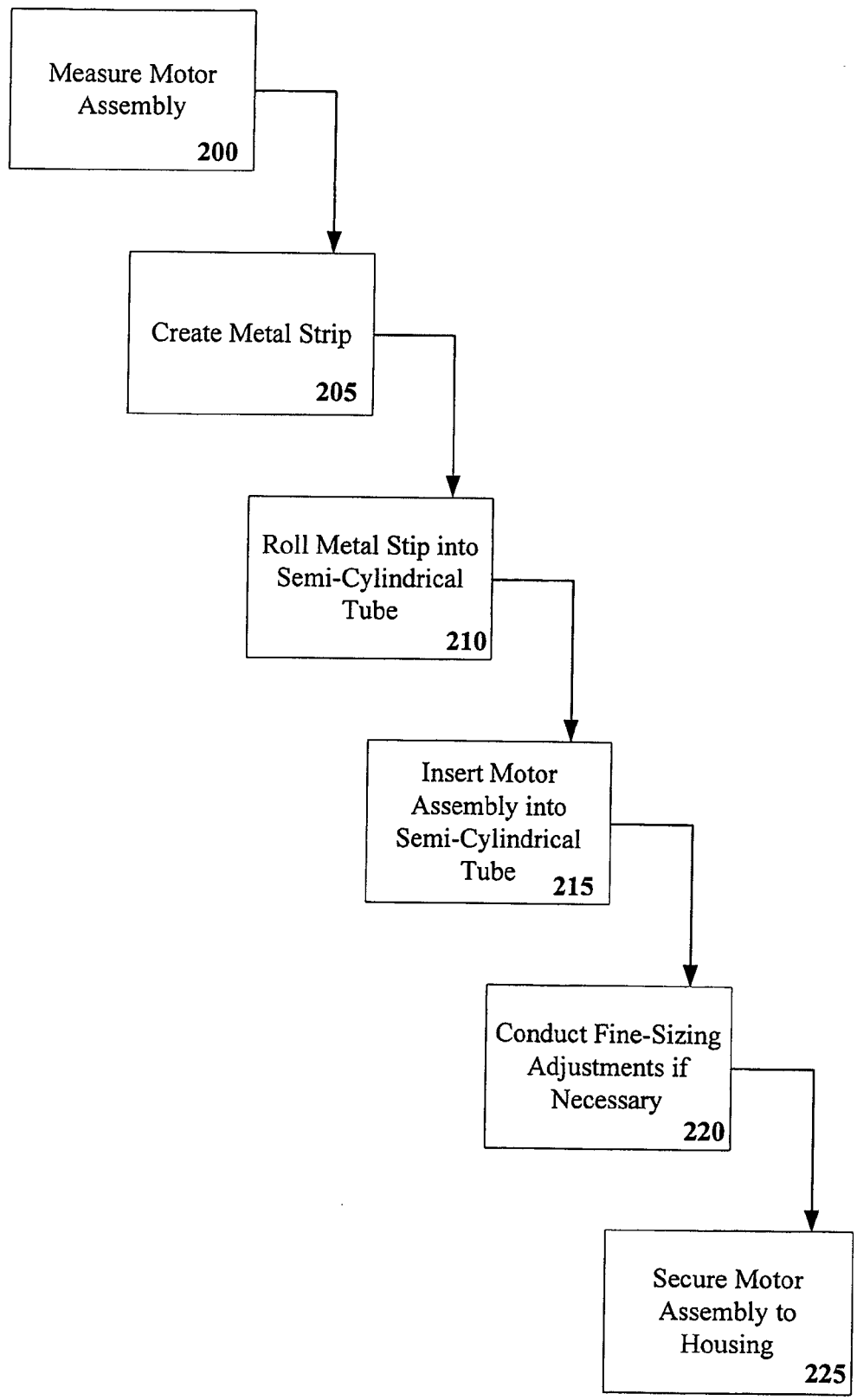
FIG. 2 is a flow-diagram disclosing a method for producing a motor housing in accordance with an embodiment of the present invention.

FIG. 2 is a high level flow diagram of the various stages associated with forming a motor housing according to an advantageous embodiment of the present invention. The process of producing a motor housing according to the present invention can be broken down into six stages. The first stage 200 is obtaining sizing characteristics from the motor assembly and will be discussed in greater detail with regard to FIG. 3. The second and third stages 205, 210 shape a piece of metal into the motor housing. The final three stages 215, 220, 225 are inserting, size-adjusting if necessary, and securing a motor assembly in the housing.

Figure 3:
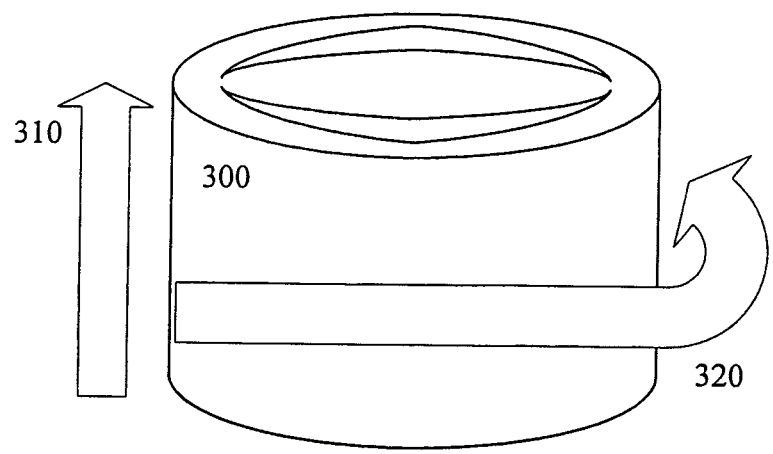
FIG. 3 illustrates the elements in a motor housing formed according to an advantageous embodiment of the present invention.

First, the sizing constraints of a motor assembly are identified. As shown in FIG. 3, the relevant measurements of the motor assembly 300 are its circumference 320 and length/height 310. These measurements can come from design specifications or from measuring actual motor assemblies. The critical dimension for fitting the motor within the housing is the motor assembly's circumference. However, at this point in the process, it is only necessary to obtain a rough estimate of the circumference. The actual fine-sizing of the motor housing if necessary will be achieved in step 220 prior to securing the motor housing to the motor assembly.

Figure 4A:
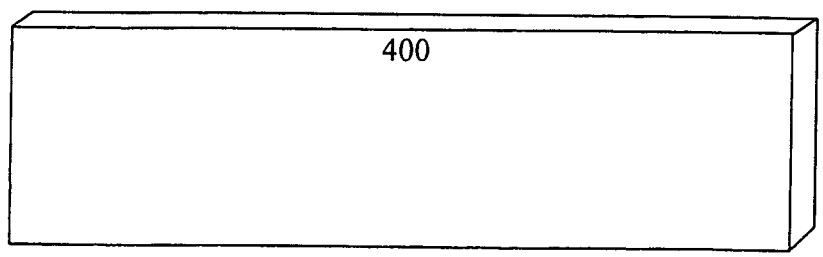
FIGS. 4A-4D illustrate different stages associated with forming the motor housing according to an embodiment of the present invention.
Figure 4B:
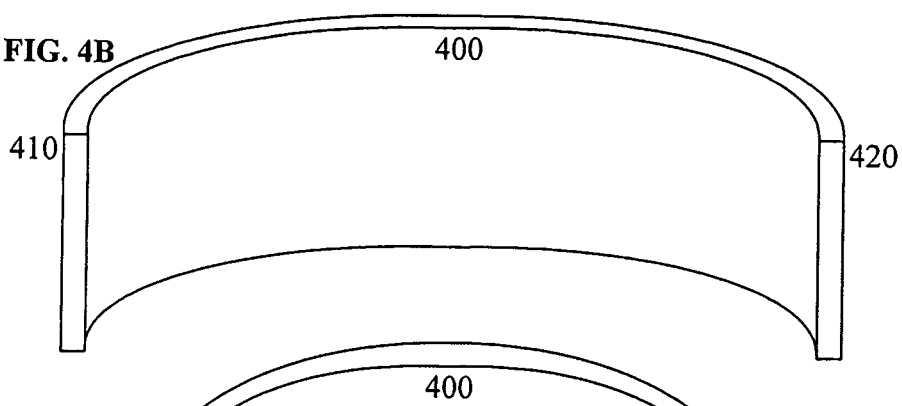
Figure 4C:
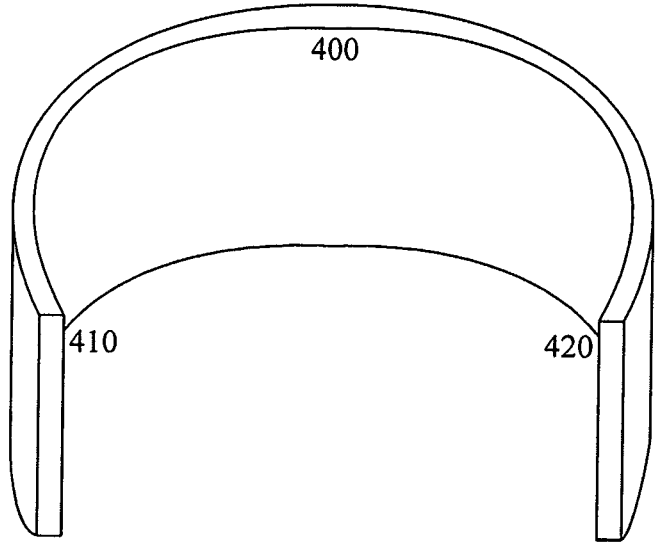
Figure 4D:
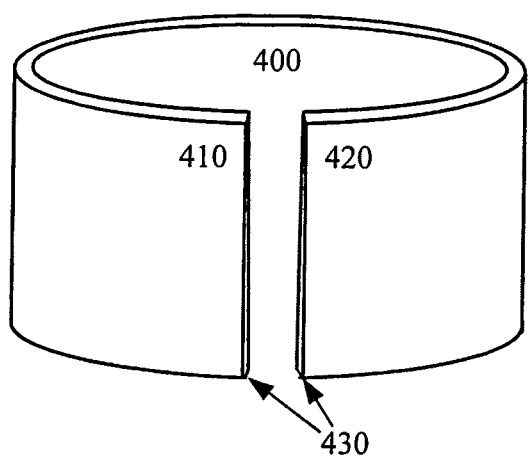

FIGS. 4A-4D illustrate stages 205 and 210 of creating the metal strip and forming a split annulus. The annulus 400 is formed by two ends rolled toward each other to form a hollow tube and is generally shaped like a cylindrical tube with a slit 430 along a longitudinal axis. It is to be understood that the annulus may be formed by any metal shaping device that performs metal shaping, such as a steel roller in combination with at least one rubber coated roller or a plurality of steel rollers that shape the metal sheet, such an apparatus may be seen at www.roundo.com. As shown in FIG. 4D, the width of the longitudinal slit 430 is exaggerated for illustrative purposes. Both ends have a spring-like action that provides for elastic deformation of the ends while the motor assembly is inserted, after which the ends spring back into the rolled position.

Two exemplary methods of producing the annulus 400 from a metal strip may include stamping or cutting the features of the housing in a flat sheet or strip of metal. The metal used for the annulus may include any suitable metals, such as steel or aluminum. Furthermore, it is to be understood that any the features of the housing, such as went holds, bolt holes, slots and other housing features may be formed in the flat sheet of metal prior to forming the split annulus.

It is also to be understood that the process of forming the annulus is not limited to the embodiment illustrated herein. In an alternate embodiment, instead of starting with a flat sheet of metal that is pre-cut or stamped in accordance with a specified length and height, stock metal cylinders may be utilized. A stock cylindrical tube can be longitudinally slit to form an annulus.

In an alternate embodiment, long sheets of stock metal may be pre-rolled into split annuli with various standardized circumferences. The stock split annuli may be selected that correspond to the circumference of a given motor assembly and cut to match the height of the motor assembly. The stock split annuli are also fine-sized if necessary in accordance with the deformation/welding process described in greater detail below.

FIG. 4A illustrates the initial stage in the annulus 400 rolling process (step 210 in FIG. 2). From this initial position, the ends of the flat metal sheet are incrementally deformed, so as to gradually curl each end toward the other to form a split annulus shape in accordance with an estimated outer circumference of the motor assembly. The process of deforming the ends into the split annulus may be accomplished by any deformation technique that is known in the art associated with metal shaping. FIGS. 4B and 4C illustrate intermediate stages of the rolling process 210, wherein the ends 410, 420 of sheet 400 are initially curved inward. From these intermediate stages, the rolling process continues as the ends get progressively closer, as shown in FIG. 4B and FIG. 4C. The deformation process of the ends 410, 420 continues until the inner circumference is formed in accordance with the estimated annulus. FIG. 4D illustrates the formed motor housing produced by the rolling process 210.

The inner circumference of the formed motor housing illustrated in FIG. 4D differs from the outer circumference of the motor assembly, by a user-defined tolerance. This tolerance, may be a product of several factors, such as specific motor applications and tolerances, the type of machining implemented to shape the metal sheet into the split annulus, and/or the type of weld used in any necessary fine-sizing and securing the motor assembly to the annulus.

Figure 5A:
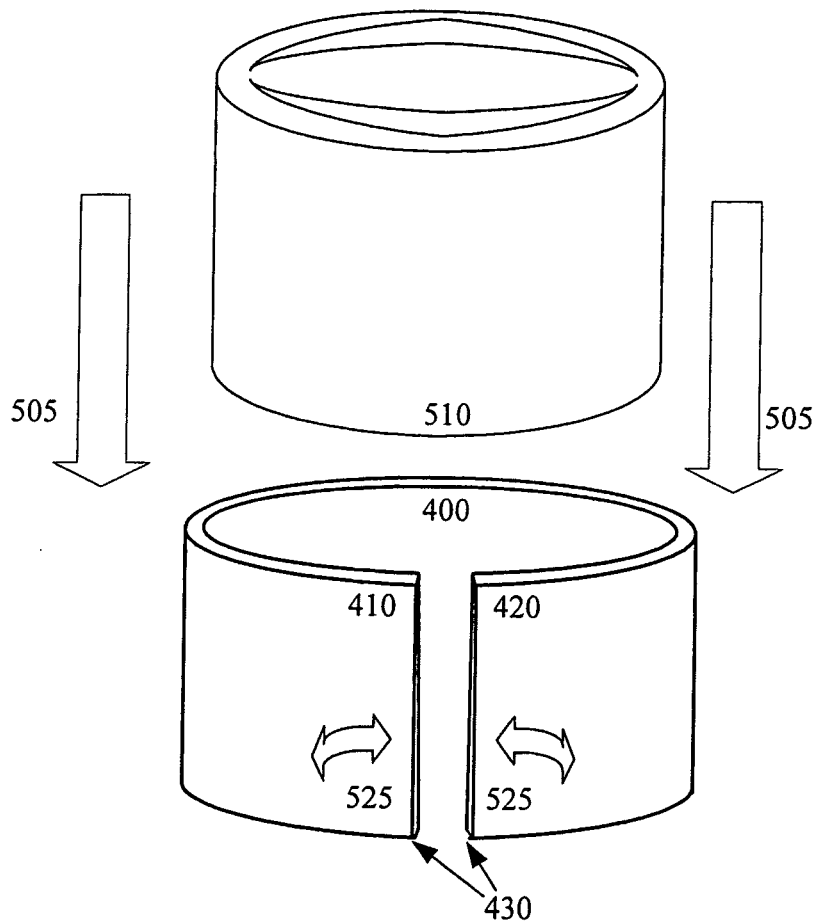
FIGS. 5A-5B illustrate the process of inserting the motor assembly into the motor housing according to an embodiment of the present invention.
Figure 5B:
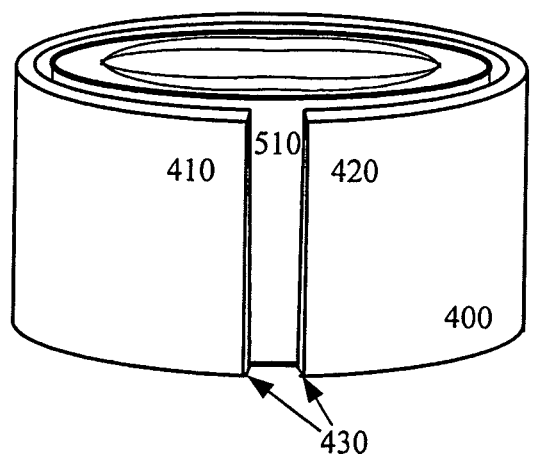

FIGS. 5A and 5B illustrate the stages of inserting the motor assembly into the motor housing (215, 220) according to an exemplary embodiment of the invention. Specifically, in FIG. 5A, the motor assembly 510 is inserted into a split annulus 400. The assembly 510 is inserted in the axial direction indicated by arrows 505. Ends 410 and 420 of the metal sheet are free floating and may be manipulated, as shown by arrows 525. The spring action of the annulus 400 facilitates inserting the motor assembly 510 axially into the annulus 400. The ends of the metal sheet may be elastically deformed to increase the inner circumference of the annulus 400 as the assembly 510 is inserted. After insertion, the ends may be deformed back to their pre-insertion position. FIG. 5B illustrates the motor assembly 510 inserted into the annulus 400 before securing of the housing to the motor assembly.

Figure 6:
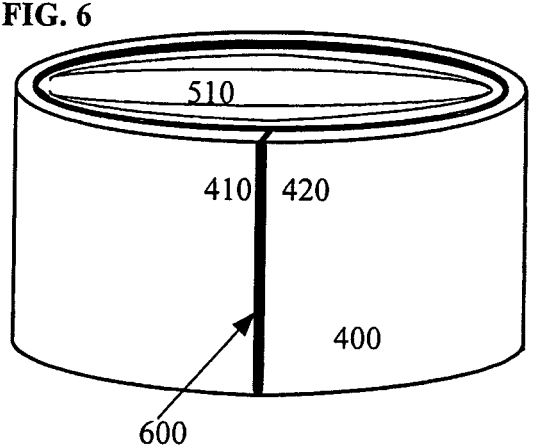
FIG. 6 illustrates the final step of securing the motor housing to the motor assembly according to an embodiment of the present invention.

As shown in FIG. 6, the motor assembly is inserted into the motor housing and ready for the final stage of securing the housing to the motor assembly 510. If necessary, the split annulus 400 is fine-sized with respect to the assembly 510 by pulling the edges of the annulus 400 toward each other and achieving a tight wrap. It is to be understood that the housing should be formed in accordance with tolerances that do not require additional machining. The welding process described herein may account for typical variations in the manufacturing process. Once the elements are positioned, the ends 410, 420 may be welded together along weld-line 600, so as to secure the lateral ends of the housing. This process might also involve welding the motor housing to the motor assembly 510. The fine-sizing process may include adjustments associated with the edges 410, 420. For example, edges 410 and 420 as in FIG. 5B may be pushed outward or spaced farther apart to increase the inner circumference of the housing. Alternately, the edges 410, 420 may be deformed inward or moved closer together to decrease the inner circumference of the annulus 400. In another embodiment, the housing may be formed from stacks of lamination secured by a slot liner and/or a motor winding.

Moreover, the weld itself may act to eliminate extraneous space between the assembly 510 and the annulus 400. The annulus 400 does not necessarily have to be secured to a finished motor assembly. Annulus 400 can be secured to the elements of the assembly ranging from laminations to finished stators. Furthermore, depending on the manufacturing considerations related to the motor, the process of joining the ends of the annulus 400, may involve simply welding one end to the other, or alternately welding both edges to each other and the motor assembly.

The weld on the annulus provides several benefits with regard to the motor assembly housing. Specifically, after any necessary fine-sizing is completed and the assembly is inserted, the weld acts to complement the fine-sizing and account for any remaining variations in dimensions. This leads to a reduction in machining from the outset and simplifies the manufacturing process. It is to be understood that depending on the embodiment, only the ends of the annulus may be welded, which in turn act crimp the motor assembly in place or the weld may be applied to the ends of the annulus and the motor stator, itself. Further, it is to be understood that the weld may be applied to other aspects of the motor assembly, including but not limited to stators comprising a stack of laminations or to a wound and varnished stator.

The joining of the annulus ends accomplished by the welding process creates a tension which holds the motor assembly, i.e., a crimping action that clamps around the stator's outer contour. Also, if the weld fuses the motor assembly to the motor housing, it creates a very strong structural support and bond between the housing and the stator. Advantageously, the stator as part of the motor assembly does not need to be welded before insertion, because once inserted the housing provides a sufficient support to the assembly. Furthermore, it is to be understood that exemplary welding methods may include Metal Inactive/Active Gas (MIG/MAG) welding or Manual Metal Arc (MMA welding), but are not limited to such welding methods.

It should be understood that the above description is only representative of illustrative embodiments. For the convenience of the reader, the above descriptions have focused on a representative sample of possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

I claim:

1. A method for securing a motor housing to a motor assembly comprising:
    inserting a motor assembly into a cylindrical hollow tube, wherein the tube has a longitudinal slit defined by edges of the tube;
    manipulating said edges to accommodate the inserted motor assembly; and
    securing the motor housing in place on the motor assembly by welding said manipulated edges to each other and to a motor stator associated with the motor assembly.

2. The method of claim 1, wherein the cylindrical hollow tube circumferentially encloses the inserted motor assembly after securing the motor housing in place.

3. The method of claim 2, wherein the cylindrical hollow tube is formed from a single sheet of metal.

4. The method of claim 3, wherein the single sheet of metal is rolled in accordance with size constraints based on the motor assembly to form the cylindrical hollow tube.

5. The method of claim 1 further comprising cutting the cylindrical hollow tube from a pre-rolled stock piece of metal.

\* \* \* \* \*